U S010257024B2

United States Patent
Zhou et al.

(10) Patent No.: US 10,257,024 B2
(45) Date of Patent: Apr. 9, 2019

(54) DATA TRANSMISSION METHOD, APPARATUS, AND TERMINAL

(71) Applicant: Wangsu Science & Technology Co., LTD, Shanghai (CN)

(72) Inventors: Jingshan Zhou, Shanghai (CN);
Jinliang Huang, Shanghai (CN);
Ningyong Zou, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 62 days.

(21) Appl. No.: 15/535,033

(22) PCT Filed: May 11, 2015

(86) PCT No.: PCT/CN2015/078704
§ 371 (c)(1),
(2) Date: Jun. 9, 2017

(87) PCT Pub. No.: WO2016/101493
PCT Pub. Date: Jun. 30, 2016

(65) Prior Publication Data
US 2017/0331677 A1 Nov. 16, 2017

(30) Foreign Application Priority Data
Dec. 25, 2014 (CN) .......................... 2014 1 0844302

(51) Int. Cl.
*H04L 12/24* (2006.01)
*H04L 29/08* (2006.01)
*H04L 12/707* (2013.01)

(52) U.S. Cl.
CPC .......... *H04L 41/0668* (2013.01); *H04L 29/08* (2013.01); *H04L 45/22* (2013.01); *H04L 67/2814* (2013.01)

(58) Field of Classification Search
CPC ............ H04L 41/0654; H04L 41/0659; H04L 41/0663; H04L 41/0668; H04L 41/0672;
(Continued)

(56) References Cited

U.S. PATENT DOCUMENTS 6,308,281 B1 * 10/2001 Hall, Jr. .................. H04L 29/06
370/218
6,735,168 B1 * 5/2004 Schnell ................ H04Q 3/0025
370/217
(Continued)

FOREIGN PATENT DOCUMENTS

CN           1247425 A       3/2000
CN         103532867 A       3/2000
(Continued)

OTHER PUBLICATIONS

The World Intellectual Property Organization (WIPO) International Search Report and Written Opinion for PCT/CN2015/078704 dated Sep. 25, 2015 5 Pages.
(Continued)

*Primary Examiner* — Sharad Rampuria
(74) *Attorney, Agent, or Firm* — Anova Law Group, PLLC (57) ABSTRACT

The present disclosure provides a data transmission method, an apparatus and a terminal. The method includes: establishing a plurality of physical connections between a first network element and a second network element; establishing a plurality of virtual connections on each of the physical connections; selecting a first virtual connection from the plurality of virtual connections based on a pre-determined rule; and executing a data transmission process on the selected first virtual connection. By using the present disclosure, the issues of poor transmission quality and waste of resources when using a TCP connection in the relevant art to perform data transmission may be solved, thereby improving the transmission efficiency of data.

19 Claims, 8 Drawing Sheets

(58) Field of Classification Search
CPC ......... H04L 45/22; H04L 45/28; H04B 10/03; H04B 10/032; H04B 10/035; H04B 10/038; H04J 14/0287; H04J 14/0289; H04J 14/029; H04J 14/0291; H04J 14/0293; H04J 14/0294; H04J 14/0295; H04J 14/0297; H04J 2203/006
See application file for complete search history.

(56) References Cited

U.S. PATENT DOCUMENTS

| | | | |
|---|---|---|---|
| 9,553,829 B2 * | 1/2017 | Wang | H04L 49/65 |
| 10,103,980 B1 * | 10/2018 | Tiwari | H04L 49/1561 |
| 2004/0218554 A1 | 11/2004 | Saint Etienne et al. | |
| 2010/0262359 A1 | 10/2010 | Motoyama | |
| 2013/0024561 A1 | 1/2013 | Imai | |
| 2016/0373441 A1 * | 12/2016 | Sirivara | H04L 63/0869 |

FOREIGN PATENT DOCUMENTS

| | | |
|---|---|---|
| CN | 102244645 A | 11/2011 |
| CN | 102739515 A | 10/2012 |
| CN | 103618678 A | 3/2014 |
| CN | 104539531 A | 4/2015 |

OTHER PUBLICATIONS

The European Patent Office (EPO) The extended European search report for 15871569.8 May 15, 2018 31 Pages.

* cited by examiner

DATA TRANSMISSION METHOD, APPARATUS, AND TERMINAL

CROSS-REFERENCES TO RELATED APPLICATIONS

This application is a national phase entry under 35 U.S.C § 371 of International Application No. PCT/CN2015/078704, filed on May 11, 2015, which claims priority of Chinese Patent Application No. 201410844302.7, filed with the State Intellectual Property Office of P. R. China on Dec. 25, 2014, the entire contents of all of which are incorporated herein by reference.

FIELD OF THE DISCLOSURE

The present disclosure generally relates to the field of communication and, more particularly, relates to a data transmission method, an apparatus, a terminal, and a storage medium.

BACKGROUND

Currently, most services over the network are based on transfer control protocol (TCP). A client establishes a TCP connection with a server, and then the client and the server exchange data. The communication quality depends entirely on the TCP and the network status between the server and the client.

To improve the service quality, various technologies are often used to accelerate the network communication between the client and the server. A proxy server is most often used. A machine that ensures a smooth network between the client and the server is selected as the proxy server. Data is not sent directly from the client to the server, but is first sent to the proxy server and then sent by the proxy server to the server. Accordingly, the network may be prevented from being congested, and the transmission quality is improved.

Such accelerating solution has several drawbacks.

1. The proxy server may only solve partial problems. Only when the network link between the client and the server is poor and a proxy server with a good connection with the client and the server can be found, the proxy server may be used to improve the service quality. When the network of the client or the server itself is unstable, for example, the packet loss rate is high or the time delay is long, the TCP may fail to achieve the desired transmission quality even if the proxy server is used.

2. In a conventional proxy server, each task needs to establish a TCP connection to the proxy server, and the proxy server establishes another TCP connection to the server. For a large amount of small data transmission, the TCP connections between the client and the proxy server and between different proxy servers may need to be established and cut off frequently, resulting in the waste of resources, which even affects the service quality.

Meanwhile, because of the slow start characteristics of the TCP, a newly established TCP connection needs a certain period of time to adjust parameters to achieve an optimal transmission performance. The use of a long connection may alleviate such a situation. But too many idle connections may aggravate the consumption of the resource.

3. In a conventional proxy server, each application service is bound to a TCP connection between the client and the proxy server and a TCP connection between the proxy server and the server. When an issue occurs at any of the TCP connections, the service may be degraded and the connection may be even cut off. Further, once the TCP connections are established, the proxy server cannot be replaced based on the network status.

Directed towards related technologies, no effective solution has been proposed to solve existing issues of poor transmission quality and waste of resources when the TCP connection performs data transmission.

BRIEF SUMMARY OF THE DISCLOSURE

The present disclosure provides a data transmission method, an apparatus, a terminal, and a storage medium to solve issues of poor transmission quality and waste of resource existing in the related art when a TCP connection is applied to perform data transmission.

According to one aspect of the present disclosure, a data transmission method is provided, comprising: establishing physical connections between a first network element and a second network element; establishing a plurality of virtual connections on each of the physical connections; selecting a first virtual connection from the plurality of virtual connections based on a pre-determined rule; and executing a data transmission process on the selected first virtual connection.

According to another aspect of the present disclosure, a data transmission apparatus is provided, comprising: a first establishment module for establishing physical connections between a first network element and a second network element; a second establishment module for establishing a plurality of virtual connections on each of the physical connections; a selection module for selecting a first virtual connection from the plurality of virtual connections based on a pre-determined rule; and an execution module for executing a data transmission process on the selected first virtual connection.

According to another aspect of the present disclosure, a terminal is further provided and configured to execute a program code of steps provided by the data transmission method.

According to another aspect of the present disclosure, a storage medium is further provided and configured to store a program code executed by the data transmission method.

Through the present disclosure, physical connections established between a first network element and a second network element; a plurality of virtual connections are established on each of the physical connections; a first virtual connection is selected from the plurality of virtual connections based on a pre-determined rule; and a data transmission process is executed on the selected first virtual connection. Accordingly, the existing issues of poor transmission quality and waste of resource in the relevant art when a TCP connection is applied to perform data transmission are solved, and further, data transmission efficiency is improved.

BRIEF DESCRIPTION OF THE DRAWINGS

The accompanying drawings illustrated herein are used to provide further understanding of the present disclosure, thereby forming a part of the present disclosure. Exemplary embodiments of the present disclosure and illustrations thereof are configured to explain the present disclosure, but not constituting inappropriate limitations of the present disclosure. In the accompanying drawings.

DETAILED DESCRIPTION

The present disclosure will be illustrated in detail hereinafter with reference to the accompanying drawings taken in conjunction with embodiments. It should be noted that, when there is no conflict, embodiments of the present disclosure and features of the embodiments may be combined with each other.

Figure 1:
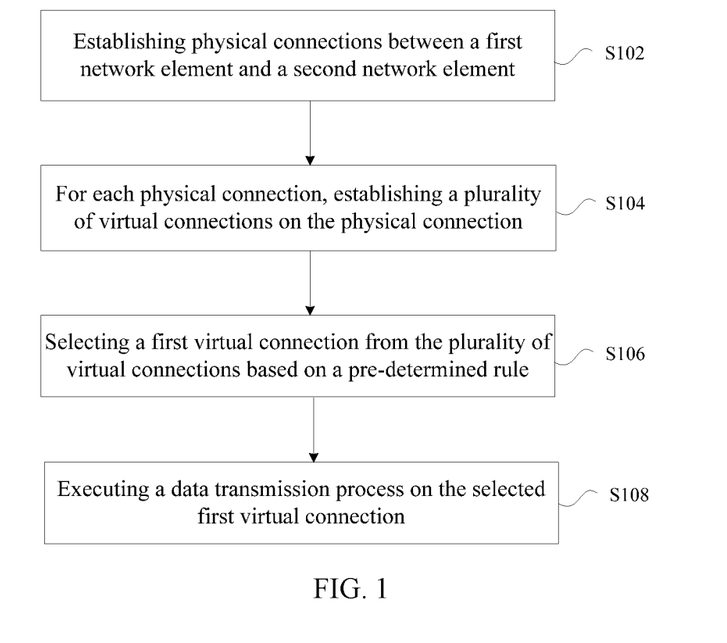
FIG. 1 is a flow chart of a data transmission method according to embodiments of the present disclosure.

The present disclosure provides a data transmission method. FIG. 1 is a flow chart of an exemplary data transmission method according to embodiments of the present disclosure. As shown in FIG. 1, the flow chart includes the following steps.

Step S102: establishing physical connections between a first network element and a second network element;

Step S104: for each physical connection, establishing a plurality of virtual connections on the physical connection;

Step S106: selecting a first virtual connection from the plurality of virtual connections based on a pre-determined rule;

Step S108: executing a data transmission process on the selected first virtual connection.

Through the aforementioned steps, in a process of performing data transmission between the first network element and the second network element, first, physical connections may be established between the first network element and the second network element. Further, a plurality of virtual connections may be established on each of the physical connections, and the plurality of virtual connections may be utilized to perform data transmission between the first network element and the second network element. Compared to existing technologies where physical transmission can be only carried out between the first network element and the second network element, the aforementioned steps may solve the issues of poor transmission quality and waste of resources when the TCP connection in the relevant art is applied to perform data transmission, thus improving the data transmission efficiency.

During a process of performing data transmission on the selected first virtual connection, in some embodiments, when the first virtual connection fails to satisfy the data transmission requirement or a malfunction occurs on the first virtual connection, the data transmission process may be switched to a second virtual connection in the plurality of virtual connections. The second virtual connection that satisfies the data transmission requirement may be utilized to transmit data. Thus, even when an issue occurs at the virtual connection that transmits data, the data transmission may be still fulfilled.

In some embodiments, when a malfunction occurs at the first physical connection in the plurality of physical connections, the first virtual connection may be transferred to a second physical connection in the plurality of physical connections. Thus, even when an issue occurs at the physical connection that transmits data, the data transmission may be still fulfilled via other physical connections.

Before data transmission, one or some virtual connections need to be selected for data transmission. It should be noted that, many criteria may be used to select the virtual connections, and an example is provided hereinafter for illustrative purposes. In some embodiments, the first virtual connection may be selected according to a routing strategy. In particular, the conditions for determining the routing strategy may include at least one of following factors: transmission bandwidth, transmission speed and transmission cost.

In some embodiments, the physical connections may be a transmission control protocol (TCP) connection and/or a user datagram protocol (UDP) connection. In some embodiments, based on the network condition that the first network element and the second network element belong to and/or the data transmission requirement, the TCP connection or the UDP connection may be selected and established.

In some embodiments, when a plurality of first virtual connections is selected, a time-division multiplexing technology may be used to transmit data.

A direct connection or an indirect connection may be established between the first network element and the second network element. In some embodiments, one or a plurality of proxy servers may be configured between the first network element and the second network element. A physical connection may be established between the first network element and the proxy server, and further, a physical connection may be established between the proxy server and the second network element. When a plurality of proxy servers is configured, physical connections may be established between the plurality of proxy servers. Thus, an indirect connection may be established between the first network element and the second network element through the proxy servers.

The present disclosure also provides a data transmission apparatus. The apparatus may be used to implement the aforementioned embodiments, and illustrations provided above are not repeatedly described herein. As used hereinafter, the term "module" may implement a combination of software and/or hardware with a pre-determined function. Although the apparatus described in the following embodiments may be implemented by software, implementation by hardware or a combination of software and hardware may also be made possible and envisioned.

Figure 2:
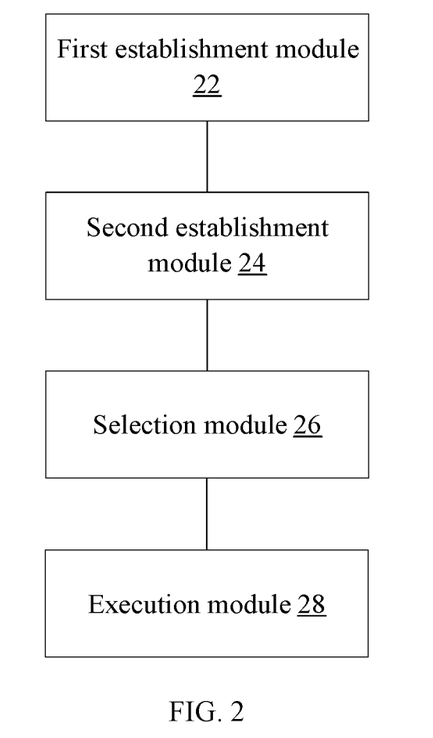
FIG. 2 is a structural block diagram of a data transmission apparatus according to embodiments of the present disclosure.

FIG. 2 is a structural block diagram of an exemplary data transmission apparatus according to the present disclosure. As shown in FIG. 2, the data transmission apparatus may include: a first establishment module 22 for establishing physical connections between a first network element and a second network element; a second establishment module 24 configured to for establishing a plurality of virtual connections on each of the physical connections; a selection module 26 for selecting a first virtual connection from the plurality of virtual connections based on a pre-determined rule; and an execution module 28 for executing a data transmission process on the selected first virtual connection.

Figure 3:
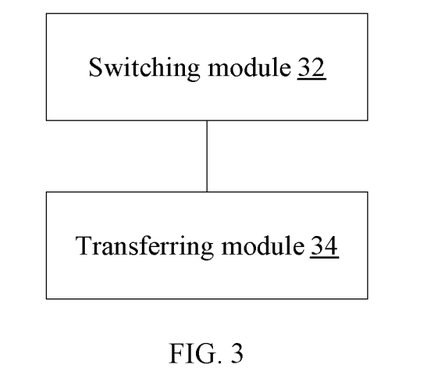
FIG. 3 is a structural block diagram (1) of a data transmission apparatus according to embodiments of the present disclosure.

FIG. 3 is a structural block diagram (1) of an exemplary data transmission apparatus according to embodiments of the present disclosure. As shown in FIG. 3, the data transmission apparatus may further include: a switching module 32, configured to switch the data transmission process to a second virtual connection in the plurality of virtual connections when the first virtual connection fails to satisfy the data transmission requirement, and further transmit data using the second virtual connection, where the second virtual connection satisfies the transmission requirement of such data; a transferring module 34, configured to transfer the first virtual connection to a second physical connection in the plurality of physical connections when a malfunction occurs at the first physical connection in the plurality of physical connections.

Figure 4:
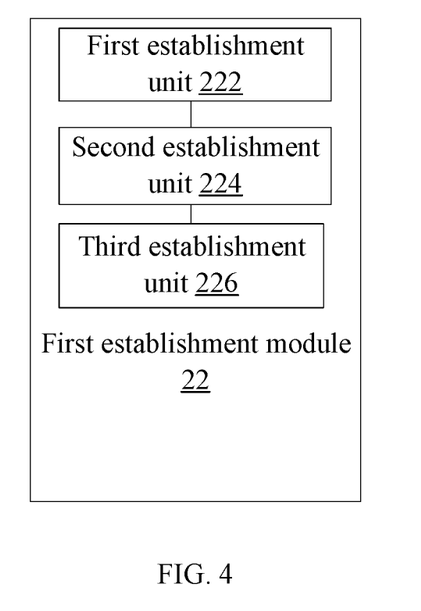
FIG. 4 is a structural block diagram (2) of a data transmission apparatus according to embodiments of the present disclosure.

FIG. 4 is a structural block diagram (2) of an exemplary data transmission apparatus according to embodiments of the present disclosure. As shown in FIG. 4, when one or a plurality of proxy servers is configured between the first network element and the second network element, the first establishment module 22 may further include a first establishment unit 222 for establishing a physical connection between the first network element and the proxy server; a second establishment unit 224 for establishing a physical connection between the proxy server and the second network element; and a third establishment unit 226 for, when a plurality of proxy servers exists, establishing physical connections between the plurality of proxy servers.

In some embodiments, the first establishment module 22 may be further configured to select and establish the transmission control protocol TCP connection or the user datagram protocol UDP connection based on the network status that the first network element and the second network element belong to and the data transmission requirement.

In some embodiments, the selection module 26 may be further configured to select the first virtual connection according to routing strategy. The conditions for determining the routing strategy may include at least one of following aspects: transmission bandwidth, transmission speed and transmission cost. When a plurality of first virtual connection is selected, the time-division multiplexing technique may be used to transmit data.

It should be noted that each of the aforementioned modules can be implemented by software or hardware. When implemented by hardware, the following method may be applied for implementation, however, the present disclosure is not limited thereto: each of the aforementioned modules may be located in a same processor, or each of the aforementioned modules may be located in a first processor, a second processor, and a third processor, respectively.

To address the aforementioned issues existing in the related art, illustrations are provided with reference to optional embodiments, and the present optional embodiment may take into conjunction the aforementioned embodiments and optional implementation methods thereof.

Hereinafter, a general network protocol speed-up system based on application layer virtual connection is provided as an example for illustrative purposes.

Other than the proxy technology, the disclosed system further uses a protocol optimization method to optimize point-to-point transmission. Based on the UDP packet, a reliable communication protocol is realized. The communication protocol is optimized, such that the UDP may be better adapted to a poor network environment than TCP and the speed-up effect may be greatly improved.

In some embodiments, the general network protocol speed-up system may introduce a multiplexing technique to combine data of a plurality of tasks into a single physical connection, thus improving the transmission efficiency and reducing resource consumption.

In some embodiments, the general network protocol speed-up system may adopt a dynamic virtual connection technique. Each application service may correspond to a virtual connection. Virtual connections may be no longer bound to the fixed physical connections, but instead, may migrate dynamically based on needs. Even if a corresponding physical connection is cut off, the virtual connection link may be re-established via migration to ensure the availability of the virtual connection.

In some embodiments, the general network protocol speed-up system implements a reliable transmission protocol based on an unreliable packet of the UDP; similar to the TCP protocol, such protocol may ensure the accuracy and integrity of data flow through data acknowledgement and lost packet re-transmission. The protocol may improve the datagram acknowledgement mechanism, reduce the dependency on real-time acknowledgement packet, and substantially improve the transmission efficiency. The protocol may further achieve an optimal transmission effect by adjusting the sending speed of the UDP packet based on the statistic values of the transmission situation, such as the packet loss rate, the transmission speed, etc.

In some embodiments, the general network protocol speed-up system may integrate both two solutions of the protocol speed-up and the proxy speed-up. An appropriate protocol may be selected based on the network situation and the transmission requirement. The routing algorithm may be applied to select one or a plurality of machines as proxy server based on detection data between the machines. In a plurality of connections of a routing path, the TCP or UDP protocol may be utilized synthetically and the proxy server may be used for protocol switch.

In some embodiments, the general network protocol speed-up system may use one or a plurality of proxy servers to speed up a connection. Through detection, the transmission speed and the bandwidth between the machines may be obtained. Further, taken into consideration factors such as the cost, the proxy servers needed for the speed-up may be calculated. Further, the optimal speed-up result may be achieved by using different routing strategies according to different application requirements.

In some embodiments, the general network protocol speed-up system may adopt a virtual connection technique. A plurality of virtual connections may be established on one physical connection (TCP connection or UDP connection). The plurality of virtual connections use the same physical connection to transmit data through a time-division multiplexing technology.

For each application connection, visual connections may be established from the client to 0 or a plurality of proxy servers and finally to the server. The data transmitted by the application may be transmitted sequentially through the plurality of virtual connections.

In some embodiments, each application connection may correspond to a virtual connection link. But the virtual connection link is not fixed. When the virtual connection link is detected not satisfying the transmission requirement, the system may automatically establish another link to replace the old link. The integrity of the application connection data flow may be ensured during the link-switching process.

In some embodiments, the general network protocol speed-up system may compress, as needed, the transmitted data to reduce the network transmission amount, shorten the transmission time and decrease the bandwidth usage.

In some embodiments, the general network protocol speed-up system may perform check, as needed, on the transmitted data. The check code may be calculated at the sending terminal, and may be verified at the receiving terminal, thus ensuring the accuracy of the data.

In some embodiments, the general network protocol speed-up system may be primarily applied to speed up the application layer protocol based on TCP, such as hypertext transfer protocol (HTTP), file transfer protocol (FTP), etc., and may also be applied to speed up the application layer protocol based on UDP.

In the aspect of application access, the general network protocol speed-up system may provide a plurality of different access solutions to the client. A common solution may include: using port mapping to provide transparent speed-up, using sock5 protocol to provide proxy service, using specialized application layer speed-up protocol such as HTTP proxy, and using application programming interface (API) in software development kit (SDK) to provide access. The general network protocol speed-up system may realize transparent access for the server. No modification or special accommodation may be needed for the server.

Figure 5:
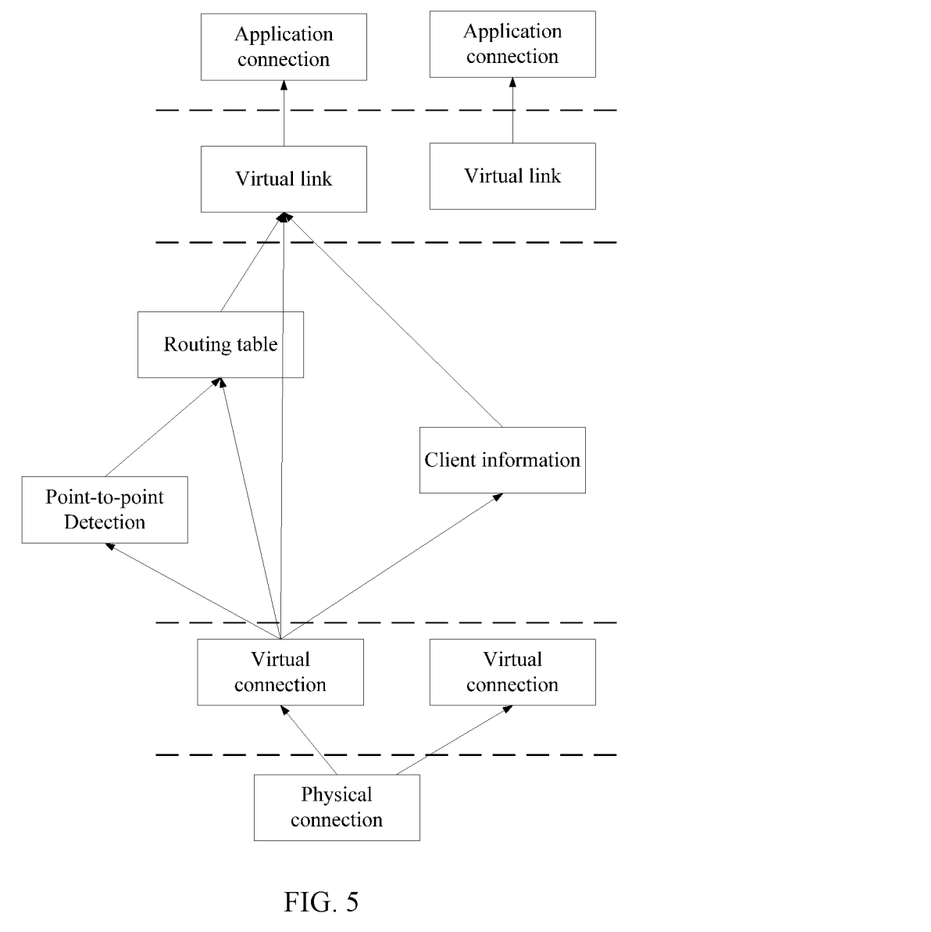
FIG. 5 is a schematic view of software modules of a network protocol speed-up system according to embodiments of the present disclosure.

FIG. 5 is a block diagram of software modules of an exemplary network protocol speed-up system according to embodiments of the present disclosure, and FIG. 5 will be explained and illustrated hereinafter.

Physical connection: the physical connections may include a TCP connection and an UDP reliable connection. The software module of the network protocol speed-up system may be responsible for establishing physical connections between different machines, selecting a TCP or UDP connection based on test results, and maintaining zero or a plurality of persistent connections as needed.

Virtual connection: a plurality of virtual connections may be established on the physical connection (TCP or UDP). Each virtual connection may be an independent full duplex data path. Each virtual connection may be assigned priority and bandwidth limitation. Different virtual connections at the same physical connection may share the bandwidth of the physical connection, but still work independently without affecting each other.

A plurality of virtual connections may be established on one physical connection. For example, in an HTTP application scenario, a plurality of HTTP requests and responses may be sent simultaneously, and the request and response data of a plurality of tasks may be overlapped with each other at any size.

On an ordinary TCP connection, HTTP requests and responses may need to obey one-to-one correspondence in an order strictly. After a plurality of HTTP requests is sent, a first response may be waited to be ended before receiving a second response. But, the visual connection may allow a plurality of responses to be received simultaneously. After a first response is partially sent, a part of a second response may be first sent, and then the remaining portion of the first response may be sent.

Point-to-point detection: via the method of request/response, the network status between two machines may be detected. The detection may include data round-trip time (RTT), and the maximum bandwidth of the physical connection, etc.

Routing table: the results of local machine point-to-point detection are recorded, and the detection results are exchanged with other machines through the virtual connections.

Each node, via interaction, may obtain desired network topology information, and such information is combined into a routing table. The routing table may be used to calculate an optimal path from the local machine to any machine in the network.

A plurality of paths may be available for selection between two machines. The two machines may be connected directly, or indirectly through one or a plurality of proxy machines.

The optimal path takes into consideration factors such as the speed, the bandwidth, and the cost, etc. to calculate the weight of each path, such that an optimal path is calculated out.

Different application scenarios concern may have different requirements for the "optimal" path. Some applications may concern about the speed, and some applications may pay attention to the cost. The routing table may include different routing algorithms to calculate the optimal path under different conditions.

For simplicity, each machine may maintain its own routing table, and independently calculate the optimal path, thus avoiding path loops due to inconsistency in the information of different machines.

Client information: the client information itself may be registered to a core network, and when needed, registration information of other machines may be acquired from the core network.

Virtual link: the optimal path is calculated via the client information and the routing table, and virtual connections are established to form a virtual connection link, where each virtual link corresponds to an application connection.

Application connection: the virtual link for transmitting application data is established, the operation situation of the virtual link is monitored in real time, and the virtual link may be re-established if the virtual link fails to satisfy the application requirement.

The virtual connection used by the application may be reset. Each application connection may be dynamically bound to a virtual connection. When the virtual connection is cut off or the bandwidth is insufficient, the application connection may give up the current virtual connection, re-calculate an optimal path, establish a new virtual connection, and transfer the application connection to the new virtual connection. The connection reset may not affect the data transmission of the application connection.

Figure 6:
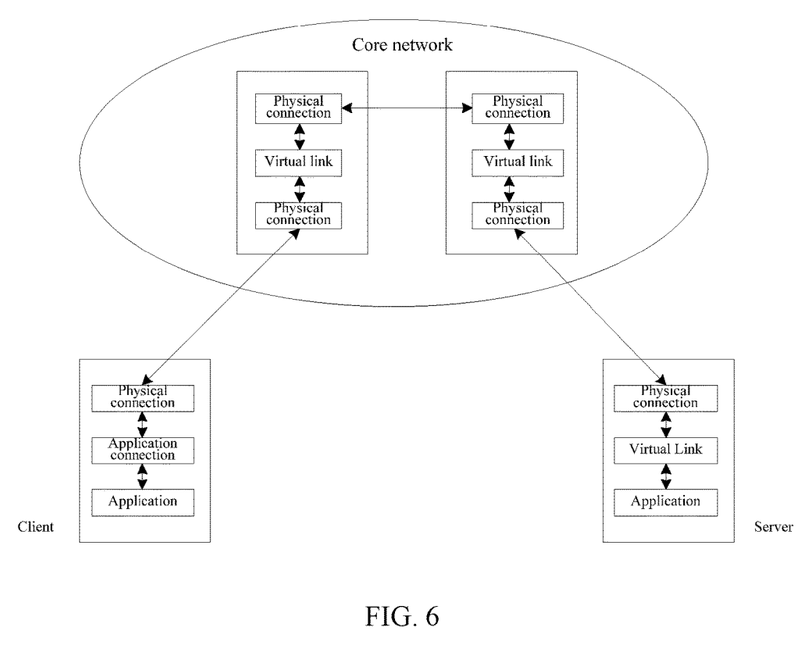
FIG. 6 is an architecture diagram of a network protocol speed-up system according to embodiments of the present disclosure.

FIG. 6 is a schematic diagram of an exemplary network protocol speed-up system according to the present disclosure. FIG. 6 illustrates a process in which a client is connected to a server through a core network.

The client application may establish an application connection, and send a connection request;

After routing calculation, the client may be connected to a proxy server 1 in the core network through the physical connection (optional, based on the routing calculation result);

The proxy server 1 may receive the client request from a physical connection 1, after being processed by the visual link, the proxy server 1 may be connected to a proxy server 2 through a physical connection 2 (optional, a plurality of proxy servers may be used, based on the routing calculation result);

After being processed, the proxy server 2 may send a request to the server;

After receiving the connection request, the server may establish connection with the application after being processed by the virtual link;

The client application and the server application may start to perform data communication.

Figure 7:
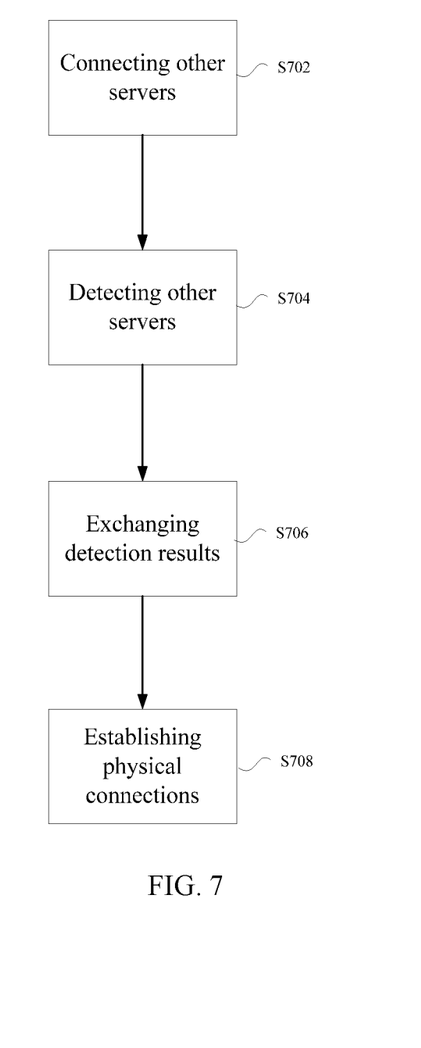
FIG. 7 is a flow chart of initializing a core network according to embodiments of the present disclosure.

FIG. 7 is a flow chart of initializing an exemplary core network according to the present disclosure. As shown in FIG. 7, the initialization process may include the following steps:

Step S702, connecting other servers;
Step S704, detecting other servers;
Step S706, exchanging detection results;
Step S708, establishing physical connections.

After being started, the proxy server may obtain a list of other servers via configuration information, and may attempt to be connected to other servers.

The proxy server may send a detection request to other proxy servers, and detect the network status such as the network time delay, packet loss rate and the network bandwidth, etc. between other servers and itself. In the initialization process, all possible proxy servers may need to be detected. When the core network is established, the proxy servers nearby (network distance) may only need to be detected on a regular basis.

The proxy server may exchange the detection results with other servers, and establish a core network routing table on each proxy server.

Based on the information of the routing table, the proxy server may maintain the physical connections with nearby proxy servers. The physical connections may connect all proxy servers together to form the core network.

Figure 8:
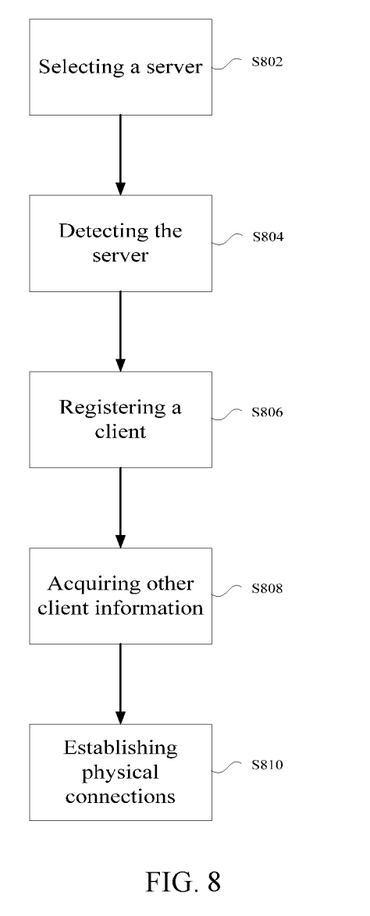
FIG. 8 is a flow chart of connecting a client to a core network according to embodiments of the present disclosure.

FIG. 8 is a flow chart of connecting a client to an exemplary core network according to the present disclosure. As shown in FIG. 8, the process may include the following steps:

Step S802, selecting a server;
Step S804, detecting the server;
Step S806, registering a client;
Step S808, acquiring other client information;
Step S810, establishing physical connections.

The client may obtain a list of proxy servers via configuration information, select one or a plurality of proxy servers, and attempt to be connected to the proxy server.

The client may send a detection request to the proxy server, and detect the network status of the client itself and the proxy server.

The client may register itself to the connected proxy servers, and the registration information may include: the proxy servers connected to the client, the network status of the client and each proxy server, and the service provided by the client, etc.

When the client needs to be connected to other clients, the client may request information of other clients from the proxy server, and establish a routing table locally.

Based on the status of the client itself and the core network, the client may establish physical connections with one or a plurality of proxy servers, and connect itself to the core network.

Figure 9:
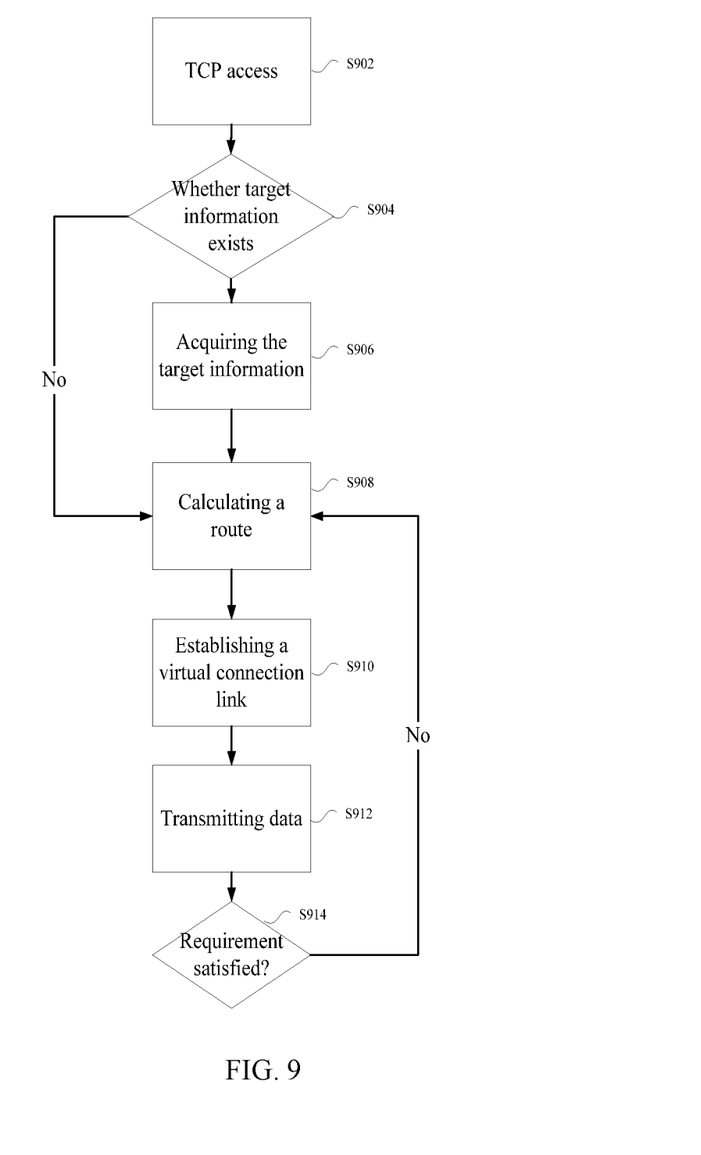
FIG. 9 is an operational flow chart of a virtual link according to embodiments of the present disclosure.

FIG. 9 is an operational flow chart of an exemplary virtual link according to the present disclosure. As shown in FIG. 9, the process may include the following steps:

Step S902, establishing a TCP access;
Step S904, determining whether target information exists, when the determination result is no, step S908 is executed, and when the determination result is yes, step S906 is executed;
Step S906, acquiring the target information;
Step S908, performing routing calculation;
Step S910, establishing a virtual connection link;
Step S912, transmitting data;
Step S914, determining whether the requirement is satisfied; when determination result is no, returning to and executing step S908.

The application may be connected to the client of the disclosed system through a TCP connection, and send a request through a designated protocol (e.g., sock5, HTTP, etc.).

The client may obtain a target address of the connection, and check whether the target information is available locally. When the client does not have the target information, the client may send a request to the proxy server to obtain the designated target information.

Based on the condition of the client itself and the condition from the target connection to the core network, the client may calculate an optimal routing path. The path may include zero or a plurality of proxy servers as transit, and the protocols used in each hop. The optimal path may be calculated based on detection results of the client and the detection data obtained from the core network with reference to the bandwidth cost and application requirement.

The client may establish a virtual connection path according to the routing path. A plurality of virtual connections may share a physical connection based on the priority of the virtual connection and the bandwidth requirement. The virtual connection may use the existing physical connection, or a newly established physical connection.

The application data may be transmitted through the established virtual connection link.

The system may monitor the transmission status of the virtual link in real time. When the virtual link fails to satisfy the application requirement, the system may re-calculate the routing, establish new virtual connection link to replace the existing, thus ensuring the transmission quality.

As such, according to the present disclosure, a plurality of virtual connections may be established on the physical connection between different network elements, thereby performing data transmission through the virtual connections and solving the issues of poor transmission quality and waste of resources when TCP connection is applied in the related art to perform data transmission in the existing technology. Thus, the data transmission efficiency may be improved.

In some embodiments, a software is provided. The software may be configured to execute the technical solutions described in the aforementioned embodiments.

In some embodiments, a storage medium is provided. The storage medium may store the aforementioned software. The storage medium may include, but not limited to, an optical disk, a floppy disk, a hard disk, and an erasable memory, etc.

As such, embodiments of the present disclosure also provide a terminal. The terminal may be any terminal device from a terminal group. Optionally, in some embodiments, the terminal may be located in at least one network device of a plurality of network devices in the network.

In some embodiments, the aforementioned terminal may execute the program code of the following steps of the data transmission method: establishing physical connections between a first network element and a second network element; for each physical connection, establishing a plurality of virtual connections on the physical connection; selecting a first virtual connection from the plurality of virtual connections based on a pre-determined rule; and executing a data transmission process on the selected first virtual connection.

In some embodiments, the computer terminal may include: one or a plurality of processors, a memory, and a transmission device.

More specifically, the memory may be configured to store the software program and modules, such as the program instructions/modules corresponding to the disclosed data transmission method and apparatus. The processor may execute various kinds of functional applications and data processing by running the software program and modules stored in the memory, that is, the aforementioned data transmission method is implemented. The memory may include a high speed random access memory (RAM), or a non-volatile memory, such as one or more magnetic memory devices, flash memory, or other non-volatile solid state memory. In some embodiments, the memory may further include a memory configured remotely with respect to the processor. Such remote memory may be connected to the terminal through network. The aforementioned network embodiments may include, but are not limited to, Internet, enterprise network, local area network, mobile communication network, and a combination thereof.

The aforementioned transmission apparatus may be configured to receive or send data through a network. The specific embodiments of the aforementioned network may include a cable network or a wireless network. In some embodiments, the transmission apparatus may include a network interface controller (NIC) that can be connected to a router via a cable or other network device to communicate with Internet or a local area network. In some embodiments, the transmission apparatus may be a radio frequency (RF) module for performing communication with the internet via a wireless method.

In particular, more specifically, the memory may be configured to store information of pre-configured actions and conditions, information of default permission user, and the application program.

The processor may retrieve the information and application program stored in the memory via the transmission device, and execute the program codes of the steps of the method disclosed in each optional or preferred embodiment.

It should be understood by those ordinarily skilled in the relevant art that the entire or partial steps of the various methods in the aforementioned embodiments may be implemented by the software program that instructs the hardware related to the terminal device. The software program may be stored in a computer readable medium. The storage medium may include a flash memory, a read-only memory (ROM), a random access memory (RAM), a magnetic disk, or an optical disk, etc.

Embodiments of the present disclosure also provide a storage medium. In some embodiments, the aforementioned storage medium may be configured to store the program code that executes the following steps:

S1, establishing physical connections between a first network element and a second network element;

S2, for each physical connection, establishing a plurality of virtual connections on the physical connection;

S3, selecting a first virtual connection from the plurality of virtual connections based on a pre-determined rule;

S4, executing a data transmission process over the selected first virtual connection.

In some embodiments, the storage medium may be further configured to store the program code that executes the following steps: after executing the data transmission process over the selected first virtual connection, the steps further include:

S1, when the first virtual connection fails to satisfy the data transmission requirement, switching the data transmission process to a second virtual connection in the plurality of virtual connections, and performing data transmission using the second virtual connection, where the second virtual connect satisfies the data transmission requirement;

S2, when a malfunction occurs at a first physical connection in a plurality of physical connections, transferring the first virtual connection to a second physical connection in the plurality of physical connections.

In some embodiments, the aforementioned storage medium may include, but is not limited to, a USB disk, a read-only memory (ROM), a random access memory (RAM), a portable hard drive, a magnetic disk, an optical disk, or other media appropriate for storing program codes.

In some embodiments, the processor executes and establishes physical connections between the first network element and the second network element by executing the program code stored in the storage medium may further include: configuring one or a plurality of proxy servers between the first network element and the second network element; establishing physical connections between the first network element and a proxy server; establishing physical connections between the proxy server and the second network element; and when a plurality of proxy servers exists, establishing physical connections between the plurality of proxy servers.

In some embodiments, the processor executes and establishes physical connections between the first network element and the second network element based on the program code stored in the storage medium may further include: selecting to establish transmission control protocol TCP connection or user data protocol UDP connection based on the network status that the first network element and the second network element belong to and the data transmission requirement.

In some embodiments, the processor selects a first virtual connection from a plurality of virtual connections based on a pre-determined rule by executing the program code stored in the storage medium may further include: selecting a first virtual connection according to routing strategy, where the conditions for determining the routing strategy may include at least one of following factors: transmission bandwidth, transmission speed, and transmission cost; when the a plurality of first virtual connections are selected, time division multiplexing technology may be applied to transmit data.

In some embodiments, specific examples of the present disclosure may refer to the examples described in the aforementioned embodiments, which will not be repeated herein.

Obviously, it should be understood by those skilled in the art that the modules or steps in the disclosed embodiments may be implemented by general computing devices. The modules and steps may be concentrated in a single computing device, or may be distributed on a network formed by a plurality of computing devices. Alternatively, the modules and steps may be implemented by computer executable program codes, which may be stored in the storage medium and may be executed by computing devices. Under certain circumstances, the implementation may be executed in orders different from the steps in the disclosed embodiments, or may be made into corresponding integrated circuit modules respectively, or may be made into a single integrated circuit module combing multiple modules or steps. Thus, the present disclosure may not be limited to any particular hardware or software or a combination of hardware and software.

The foregoing is merely some embodiments of the present disclosure and is not intended to limit the present disclosure. For those skilled in the relevant art, the present disclosure may have various alterations and changes. Without departing from the spirit and principles of the present disclosure, any modifications, equivalent alterations, and improvements, etc. shall fall within the protection scope of the present disclosure.

What is claimed is:

1. A data transmission method, comprising:
storing instructions in a memory; and
executing the instructions by a processor coupled to the memory comprising:
establishing a plurality of physical connections between a
first network element and
a second network element;
establishing a plurality of virtual connections on each of the physical connections;
detecting network status information of the plurality of virtual connections and
recording network status information of the plurality of virtual connections in a routing table;
selecting a first virtual connection from the plurality of virtual connections based on a pre-determined rule and the routing table; and
executing a data transmission process on the selected first virtual connection;
wherein detecting network status information of the plurality of virtual connections and
recording network status information of the plurality of virtual connections in a routing table further include:
detecting network status information of the physical connection between the proxy server and the first network element;
detecting network status information of the physical connection between the proxy server and the second network element; and
when the plurality of physical connections between the plurality of proxy servers are established,
detecting network status information of the plurality of physical connections between the plurality of proxy servers.

2. The method according to claim 1, wherein after executing the data transmission process on the selected first virtual connection, further including:
when the first virtual connection does not satisfy a data transmission requirement, switching the data transmission process to a second virtual connection in the plurality of virtual connections and transmitting data using the second virtual connection, wherein the second virtual connection satisfies the data transmission requirement; and
when a first physical connection in the plurality of physical connections fails, transferring the first virtual connection to a second physical connection in the plurality of physical connections.

3. The method according to claim 1, wherein establishing the plurality of physical connections between the first network element and the second network element includes:
configuring one or a plurality of proxy servers between the first network element and the second network element;
establishing a physical connection between the first network element and a proxy server;
establishing a physical connection between the proxy server and the second network element; and
when a plurality of proxy servers are configured, establishing a plurality of physical connections between the plurality of proxy servers.

4. The method according to claim 1, wherein establishing the plurality of physical connections between the first network element and the second network element further includes:
selecting to establish a TCP connection or an UDP connection based on at least one of network status that the first network element and the second network element belong to and a data transmission requirement.

5. The method according to claim 1, wherein selecting the first virtual connection from the plurality of virtual connections based on a pre-determined rule includes:
selecting the first virtual connection based on a routing strategy, wherein conditions for determining the routing strategy include at least one of a transmission bandwidth, a transmission speed and a transmission cost; and
when a plurality of first virtual connections is selected, using a time-division multiplexing technology to transmit data.

6. The method according to claim 1, wherein:
the network status information includes data round-trip time and the maximum bandwidth of a corresponding physical connection.

7. The method according to claim 1, wherein detecting network status information of the plurality of virtual connections and recording network status information of the plurality of virtual connections in a routing table further include: recording the network status information of the physical connection between the proxy server and the first network element in the routing table; recording the network status information of the physical connection between the proxy server and the second network element in the routing table; and when the plurality of physical connections between the plurality of proxy servers are established, recording the network status information of the plurality of physical connections between the plurality of proxy servers in the routing table.

8. A data transmission apparatus, comprising:
a first establishment module for establishing a plurality of physical connections between a first network element and a second network element;
a second establishment module for establishing a plurality of virtual connections on each of the physical connections,
wherein network status information of the plurality of virtual connections is detected and
recorded in a routing table;
a selection module for selecting a first virtual connection from the plurality of virtual connections based on a pre-determined rule and the routing table; and
an execution module for executing a data transmission process on the selected first virtual connection;
wherein detecting network status information of the plurality of virtual connections and
recording network status information of the plurality of virtual connections in a routing table further include:
detecting network status information of the physical connection between the proxy server and the first network element;
detecting network status information of the physical connection between the proxy server and the second network element; and
when the plurality of physical connections between the plurality of proxy servers are established,
detecting network status information of the plurality of physical connections between the plurality of proxy servers.

9. The apparatus according to claim 8, further including:
a switching module for switching the data transmission process to a second virtual connection in the plurality of virtual connections when the first virtual connection fails to satisfy a data transmission requirement, and transmitting data using the second virtual connection, wherein the second virtual connection satisfies the data transmission requirement; and
a transferring module for transferring the first virtual connection to a second physical connection in the plurality of physical connections when a first physical connection in the plurality of physical connections fails.

10. The apparatus according to claim 8, wherein when one or a plurality of proxy servers is configured between the first network element and the second network element, the first establishment module further includes:
a first establishment unit for establishing a physical connection between the first network element and a proxy server;
a second establishment unit for establishing a physical connection between the proxy server and the second network element; and
a third establishment unit for, when a plurality of proxy servers are configured, establishing a plurality of physical connections between the plurality of proxy servers.

11. The apparatus according to claim 8, wherein the first establishment module is further configured to select and establish a TCP connection or an UDP connection based on at least one of network status that the first network element and the second network element belong to and a data transmission requirement.

12. The apparatus according to claim 8, wherein the selection module is further configured to select the first virtual connection based on a routing strategy, conditions for determining the routing strategy include at least one of a transmission bandwidth, a transmission speed and a transmission cost, and when a plurality of first virtual connections are selected, a time-division multiplexing technology is used to transmit data.

13. The apparatus according to claim 8, wherein:
the network status information includes data round-trip time and the maximum bandwidth of a corresponding physical connection.

14. A terminal, configured to establish a plurality of physical connections between a first network element and a second network element;
establish a plurality of virtual connections on each of the physical connections;
detect network status information of the plurality of virtual connections and record network status information of the plurality of virtual connections in a routing table;
select a first virtual connection from the plurality of virtual connections based on a pre-determined rule and the routing table; and
executing a program code of steps of a data transmission process on the selected first virtual connection;
wherein detecting network status information of the plurality of virtual connections and
recording network status information of the plurality of virtual connections in a routing table further include:
detecting network status information of the physical connection between the proxy server and the first network element;
detecting network status information of the physical connection between the proxy server and the second network element; and
when the plurality of physical connections between the plurality of proxy servers are established,
detecting network status information of the plurality of physical connections between the plurality of proxy servers.

15. The terminal according to claim 14, configured to after the data transmission process is executed on the selected first virtual connection and when the first virtual connection fails to satisfy the data transmission requirement, switch the data transmission process to a second virtual connection in the plurality of virtual connections and transmit data using the second virtual connection, wherein the second virtual connection satisfies the data transmission requirement; and when a first physical connection in the plurality of physical connections fails, transferring the first virtual connection to a program code of steps in a second physical connection in the plurality of physical connections.

16. The terminal according to claim 14, configured to dispose one or a plurality of proxy servers between the first network element and the second network element; establish a physical connection between the first network element and a proxy server; establish a physical connection between the proxy server and the second network element; and when a plurality of proxy servers is configured, establish a program code of steps of the plurality of physical connections between the plurality of proxy servers.

17. The terminal according to claim 14, configured to select and establish a program code of steps of a TCP connection or an UDP connection based on at least one of network status that the first network element and the second network element belong to and the data transmission requirement.

18. The terminal according to claim 14, configured to select the first virtual connection based on a routing strategy, wherein conditions for determining the routing strategy include at least one of a transmission bandwidth, a transmission speed, and a transmission cost; and
when a plurality of first virtual connections is selected, using a program code of step of a time-division multiplexing technology to transmit data.

19. The terminal according to claim 14, wherein:
the network status information includes data round-trip time and the maximum bandwidth of a corresponding physical connection.

* * * * *